United States Patent [19]

Wada

[11] Patent Number: 4,726,236

[45] Date of Patent: Feb. 23, 1988

[54] ELECTROMAGNETIC FLOWMETER

[75] Inventor: Ichiro Wada, Yokohama, Japan

[73] Assignee: Kabushiki Kaisha Toshiba, Kawasaki, Japan

[21] Appl. No.: 718,275

[22] Filed: Apr. 1, 1985

[30] Foreign Application Priority Data

Apr. 26, 1984 [JP] Japan .................. 59-60779[U]

[51] Int. Cl.$^4$ .................................. G01F 1/60
[52] U.S. Cl. .................. 73/861.16; 73/861.12
[58] Field of Search ........... 73/861.12, 861.15, 861.16, 73/861.17; 128/691

[56] References Cited

U.S. PATENT DOCUMENTS

| 3,490,282 | 1/1970 | Wada | 73/861.15 |
| 3,681,986 | 8/1972 | Wyatt | 73/861.12 |
| 3,739,640 | 6/1973 | Folts | 128/691 X |
| 4,470,309 | 9/1984 | Wada | 73/861.12 |

FOREIGN PATENT DOCUMENTS 1095915 12/1967 United Kingdom ............ 73/861.12

Primary Examiner—Charles A. Ruehl
Attorney, Agent, or Firm—Oblon, Fisher, Spivak, McClelland & Maier

[57] ABSTRACT

This invention realizes an electromagnetic flowmeter detector of a short inter-face distance having a measuring tube with at least one pair of electrodes disposed mutually opposingly on the inner surface of a non-magnetic pipe through which fluid passes, and a coil section including coils wound in a toroidal form, facially symmetrically with respect to a first plane including a fluid axis and the first plane being orthogonal to a second plane including the electrodes and the fluid axis, around a magnetic core of a cylinder shape disposed concentrically with a gap on the outside of the measuring tube.

1 Claim, 39 Drawing Figures

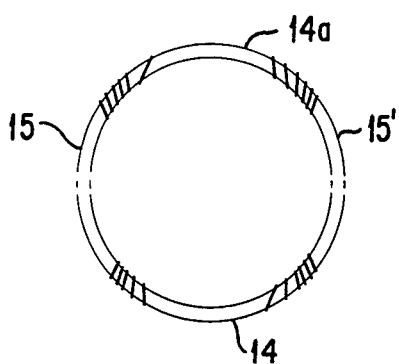
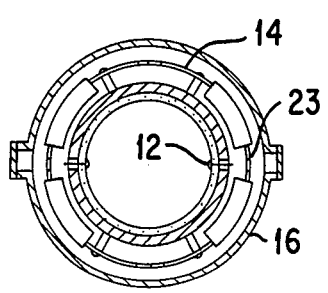
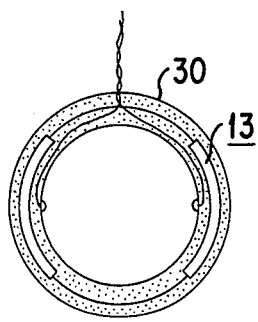
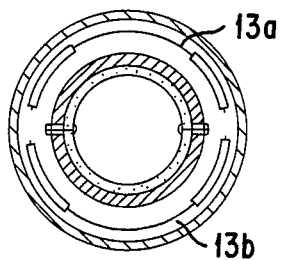
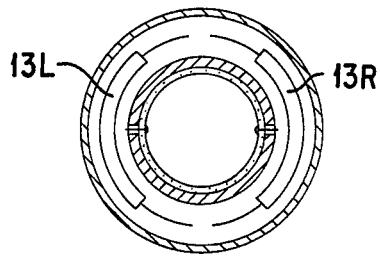

FIG. 21A  FIG. 21B  FIG. 21C  FIG. 21D
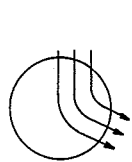 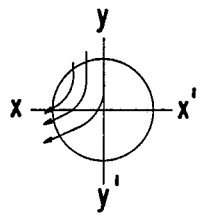 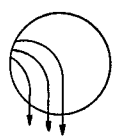 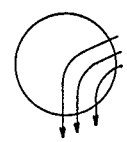
FIG. 21E  FIG. 21F  FIG. 21G  FIG. 21H  FIG. 21I
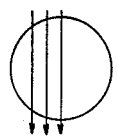 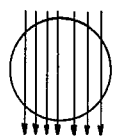 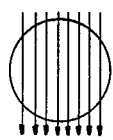 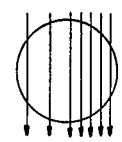 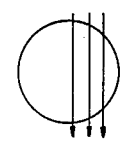
FIG. 21J  FIG. 21K  FIG. 21L  FIG. 21M  FIG. 21N
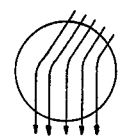 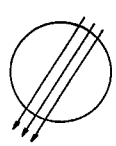 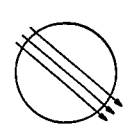 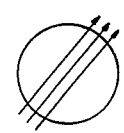 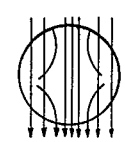

ELECTROMAGNETIC FLOWMETER

BACKGROUND OF THE INVENTION

1. Field of the Invention

This invention relates to an electromagnetic flowmeter detector.

2. Description of the Related Art

For reference, a conventional electromagnetic flowmeter detector is shown in FIGS. 1(a) and 1(b), and its coil is shown in FIG. 2. In these drawings, 1 is a mating flange, 2 is a locking bolt, 3 is an outer casing, 4 is a coil, 5 is an excitation line, 6 is a signal line, 7 is a measuring tube made of a non-magnetic pipe, 8 is an electrode, 10 is a lining, and 11 is a packing.

As shown in FIGS. 1(a) and 1(b), the conventional electromagnetic flowmeter detector has a structure whereby the thin-wound coil 4 as shown in FIG. 2 is packaged in a narrow space between the measuring tube 7 and the outer casing 3. In order to ensure an effective dimension W, the thin-wound coil 4 is in need of waste dimensions $L_1$, $L_2$ ($L_1=L_2$) similar to W. As a result, the length $L_c$ of a magnetic field generating portion increases and an inter-face distance is lengthened as shown in FIG. 1(a). In case of an increased inter-face distance, it is difficult to eliminate materials adhered on the lining inner surface of the measuring tube, and it is difficult to mount the detector in a narrow spot.

Further, the conventional coil of length $L_c$ shown in FIG. 2 is naturally long with respect to the length of the coil wire and thus its DC resistance becomes large. If the wire were made thick in order to decrease the resistance, it could not be stored in a coil accommodating space. This difficulty becomes more pronounced with an increased in diameter, and thus an electromagnetic flowmeter detector of more than 150 mm in diameter could not be easily manufactured in the prior art. If the detector were manufactured with such poor resistance properties, the rise time of a magnetic flux is delayed because of the foregoing increased DC resistance, and such detectors could be used only in limited circumstances.

SUMMARY OF THE INVENTION

Accordingly, it is an object of the present invention to provide a novel electromagnetic flowmeter detector of a short inter-face distance.

Another object of the present invention is to provide an electromagnetic flowmeter capable of measuring a flow rate accurately by specifically compensating for an influence of drift.

It is a further object of the present invention to provide an electromagnetic flowmeter equipped with an electromagnetic flowmeter detector of a short inter-face distance which can alter a flux distribution in a magnetic field with a coil having a small size in a radial direction of a measuring tube, and a converter which detects drift by altering the flux distribution in the magnetic field and providing an accurate flow rate by compensating for an influence of drift on the basis of the detected drift.

In order to achieve the foregoing objects, the present invention utilizes an electromagnetic flowmeter equipped with a measuring tube with at least one pair of electrodes disposed mutually opposite each other on the inner surface of a non-magnetic pipe through which fluid passes. A coil section includes coils wound in a toroidal form and is facially symmetrically with respect to a plane including a fluid axis and orthogonal to a plane including the electrodes and the fluid axis, around a cylindrical magnetic core disposed concentrically with a gap on the outside of the measuring tube.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 6 through 19 are schematic lateral sectional views illustrating modification examples of the present invention;

FIGS. 21 (a) through (n) are schematic diagrams illustrating, in a sectional view of a measuring tube, various flux distributions which are obtained by altering, in accordance with plural excitation patterns, excitation conditions of plural coils shown in FIG. 4 of the electromagnetic flowmeter detector;

DESCRIPTION OF THE PREFERRED EMBODIMENTS

Figure 1A:
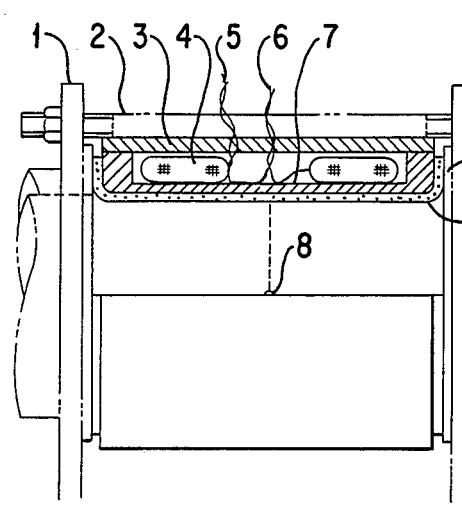
FIGS. 1(a) and 1(b) are a vertical sectional view and a lateral sectional view of the conventional electromagnetic flowmeter detector.
Figure 1B:
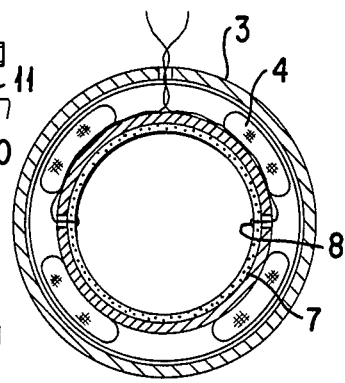
Figure 2:
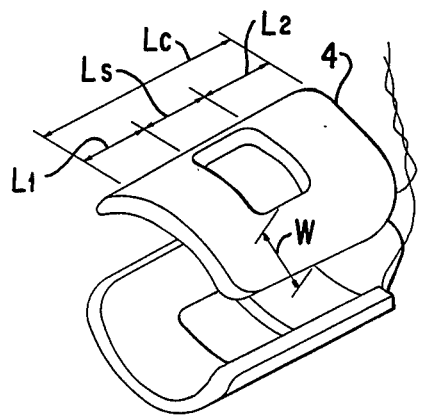
FIG. 2 is a perspective view of a coil shown in FIGS. 1(a) and 1(b)
Figure 3A:
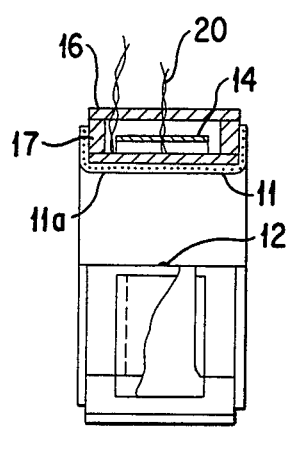
FIGS. 3(a) and 3(b) are a vertrical sectional view and a lateral sectional view of one embodiment of the electromagnetic flowmeter detector according to the present invention.
Figure 3B:
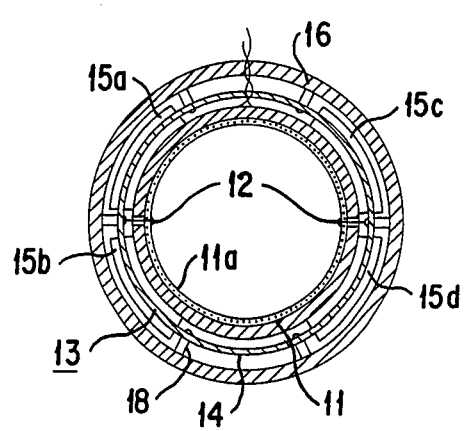
Figure 4:
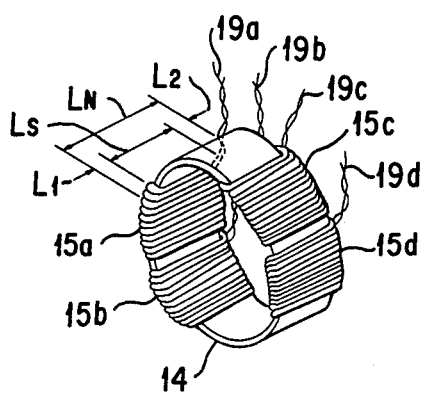
FIG. 4 is a perspective view of a coil section of the embodiment shown in FIGS. 3(a) and 3(b)

Referring now to the drawings, wherein like reference numerals designate identical or corresponding parts throughout the several views, and more particularly to FIGS. 3 and 4, there is illustrated one embodiment of the electromagnetic flowmeter detector according to the present invention. As shown in FIGS. 3(a) and 3(b), a pair of electrodes 12 are disposed in opposition to each other on a measuring tube 11 made of a non-magnetic pipe having on its inner surface a lining 11a formed by insulating material such as rubber or tetrafluoroethylene. On the outside of the measuring tube 11 a magnetic core 14 of a cylindrical shape is disposed concentrically with a gap therebetween, and around the core 14 four coils 15a, 15b, 15c and 15d are wound in a toroidal form so as to be symmetrical about and facing a first plane which includes a fluid axis wherein the first plane is orthogonal to a second plane including the electrodes 12 and the fluid axis, in order to form a coil section 13. On the outside of the coil section 13 an outer casing 16 made of ferromagnetic material of a cylinder shape is disposed with a gap therebetween. On either end portion of the outer casing 16 an outer casing end lid 17 of a ring shape is secured by welding or a like process, and an inner peripheral margin of each outer casing end lid 17 being coupled to either end portion outer periphery of the measuring tube 11 by welding or a like process. The core 14 in the coil section 13 is secured to the inner surface of the outer casing 16 at plural points by screws via spacers 18. FIG. 4 shows the appearance of the coil section 13. Respective lead wires 19a, 19b, 19c and 19d of the four-divided coils 15a, 15b, 15c and 15d may be bundled and led out as to be connected externally as shown at 20 in FIG. 3(a) or may be connected internally. This coil section 13 has waste dimensions indicated by $L_1$ and $L_2$ in FIG. 4 which are made remarkably small in comparison with the conventional coil (see FIG. 2), and the length $L_N$ of its magnetic field generating portion is also made remarkably small in comparison with the conventional structure.

Figure 5:
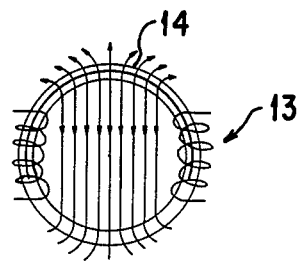
FIG. 5 is a view for explanation of the magnetic flux being generated by the coil section.

In the foregoing embodiment of the electromagnetic flowmeter detector according to the present invention, as shown in FIG. 5, the coil section 13 generates strong magnetic flux within the core (14) portions around which the coils are wound, and respective magnetic fluxes generated by coils 15a and 15b and coils 15c and 15d repulse each other within an upper core portion of the core 14 and go out from the core. Thus, measurement is achieved by the use of the magnetic flux flowing inwardly in the core 14. Accordingly, since the coil section 13 is formed by winding the coils 15a, 15b, 15c and 15d around the core 14 of a cylinder shape as shown in FIG. 4, the waste dimensions $L_1$ and $L_2$ can be made remarkably small and thus the length $L_N$ of the magnetic flux generating portion becomes remarkably small, so that the electromagnetic flowmeter detector of a short inter-face distance can be obtained.

The present invention is not necessarily limited to the foregoing embodiment, but can be realized in various modified forms as discussed below.

Figure 6:
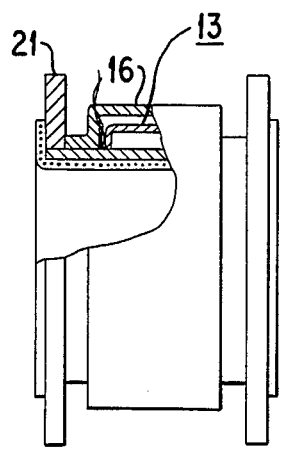

(a) The modification example shown in FIG. 6 shows the flange type construction whereby a connection flange 21 is attached to either end face of the outer casing 16 of the embodiment shown in FIGS. 3(a) and 3(b).

Figure 7:
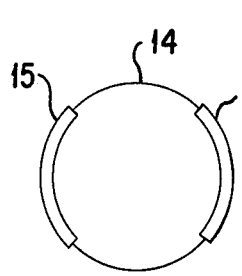

(b) The modification example shown in FIG. 7 is characterized by two-divided coils 15 and 15′ being provided symmetrically on the core 14.

Figure 8:
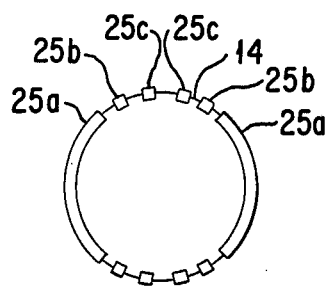

(c) The modification example shown in FIG. 8 is characterized in that the coil is divided in accordance with a function and the function-divided coils 25a, 25b and 25c are provided and distributed in accordance with the function on the core 14.

(d) The modification example shown in FIG. 9 is characterized by wire portions of coils 15 and 15′ which are closer to an upper portion 14a of the core 14 and are wound at a more rough pitch on the outer side of the core so that outward leakage of the magnetic flux at the upper core portion 14a is smaller in comparison with the inward magnetic flux.

(e) The modification example shown in FIG. 10 is characterized in that a hole 23 is bored at a position opposite to the electrode 12 of the core 11 and a window with a lid is provided at that position in the outer casing 16, so that this arrangement is convenient for locking of the electrode from external or attachment of an out-sert type electrode.

(f) The modification example shown in FIG. 11 is the electromagnetic flowmeter detector of a simple structure where the coil section 13 is molded by a molding material 30 such as epoxy-resin or urethane rubber.

(g) The modification example shown in FIG. 12 is characterized in that the coil section 13 is separated into an upper coil section 13a and a lower coil section 13b.

(h) The modification example shown in FIG. 13 is characterized in that the coil section 13 is separated into a left coil section 13L and a right coil section 13R.

Figure 14:
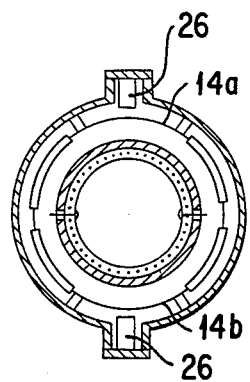

(i) The modification example shown in FIG. 14 is characterized by the fact that, in order to make smaller outward leakage of the magnetic flux at the upper portion 14a of the core 14 in comparison with going inward of the magnetic flux, auxiliary coils 26 are provided respectively on the outsides of the upper portion 14a and the lower portion 14b of the core 14.

Figure 15:
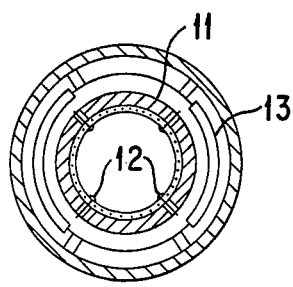
Figure 18:
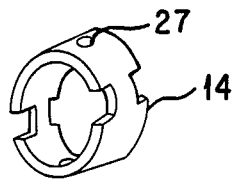

(j) The modification example shown in FIG. 15 features the combination of the measuring tube 11 with two pairs of electrodes 12 and the coil section 13 with two-divided coils.

Figure 16:

(k) The modification example shown in FIG. 16 is characterized in that a portion 14c of the core 14 around which the coil is wound is narrowed to shorten the overall length $L_N$ of the coil section. If this modification example is operated within a range where the portion indicated by $\alpha \times \omega$ in the drawing does not saturate magnetically, the magnetic property does not deteriorate even with such narrowing.

Figure 17:
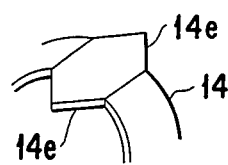

(l) The modification example shown in FIG. 17 is characterized in that each space flux generating portion, adjacent the upper and lower portions of the core 14, is shaped as to have triangular portions 14e projecting on either side, so that the magnetic field is wide in the direction of the fluid axis and an end effect (short-circuiting of fluid resistance occurring on the outside of the magnetic field) becomes small.

Figure 19:
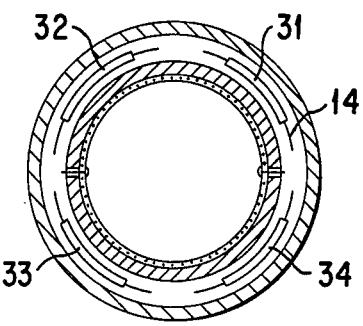

(m) The modification example shown in FIG. 19 is characterized in that one or more holes 27 are bored in each space flux generating portion adjacent the upper and lower portions of the core 14, so that the magnetic field is wide in the direction of the fluid axis and the end effect becomes small.

(n) The modification example shown in FIG. 19 is characterized in that the core 14 is divided into four and the divided core portions are wound respectively with the first quadrantal coil 31, second quadrantal coil 32, third quadrantal coil 33 and fourth quadrantal coil 34 to form the coil section, so that the strength of magnetic flux at each quadrant can be set arbitrarily.

Now, the electromagnetic flowmeter converter will be described.

Figure 20:
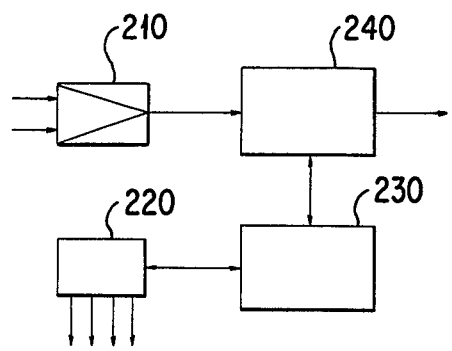
FIG. 20 is a block diagram showing the arrangement of the important portion of a converter.

The converter comprises, as shown in FIG. 20, a converting circuit 210 receiving an electromotive force signal from the detector for converting the same into a low-impedance signal, an exciting circuit 220 for driving the four coils 15a, 15b, 15c and 15d of the detector, a control unit 230 for controlling the exciting circuit 220 on the basis of plural previously-stored excitation patterns for respective coils thereby causing the exciting circuit 220 to apply an excitation signal to each coil so as to create successively different excitation patterns, and a processing function unit 240 controlled by the control unit 230 for comparing the electromotive force signal provided from the converting circuit 210 synchronously with each excitation pattern state with a previously-stored "correlation data among excitation pattern, electromotive force and drift" to detect the value of drift, for comparing the detected value with a previously-stored "relation data between the value of drift and the value of compensation relative to a flow rate signal in a given excitation pattern state" to obtain the value of compensation, and for compensating for the flow rate signal in the given excitation pattern state by means of the obtained value of compensation to provide a correct flow rate signal.

Various excitation patterns which can be created through control of the control unit 230 will be described with reference to FIGS. 21(a–n). If only the coil 15c is turned on the flux distribution becomes as shown in FIG. 21(a), if only the coil 15a is turned on FIG. 21(b) is given, if only the coil 15b is turned on FIG. 21(c) is given, and if only the coil 15a is turned on FIG. 21(d) is given.

If only the coils 15c and 15d are turned on concurrently FIG. 21(i) is given, and if only the coils 15a and 15b are turned on concurrently FIG. 21(e) is given, these resultant flux distributions giving a variation in the XX' axis direction.

Further, if excitation currents for driving the respective coils 15a, 15b, 15c and 15d are altered individually, the resultant flux distributions become as shown in FIGS. 21(f) through (h), FIGS. 21(j) through (n), etc. and can create various patterns of magnetic field.

Accordingly, the present converter can detect drift appearing in the first through fourth quadrant zones of the measuring tube 11 defined by the XX' axis and YY' axis, on the XX' axis and YY' axis, etc. In practicing the above, plural excitation patterns for generation of appropriate non-uniformly-distributed magnetic fields among the flux distributions shown in FIG. 21(g), for example, are previously stored in the control unit 230. The control unit 230 controls the exciting circuit 220 on the basis of the stored excitation patterns to drive respective coils 15a through 15d, through switches 22B–E and the use of power supply 22A by way of the control lines 23A–E thereby to create successively various types of non-uniformly-distributed magnetic fields. In addition, the control unit 230 controls the processing function unit 240, thereby causing the processing function unit to perform the following operations. That is, the electromotive force signal provided from the converting circuit 210 synchronously with each created excitation pattern is compared with the previously-stored "correlation data among excitation pattern, electromotive force and drift (having been obtained through actual examination or theoretical calculation)" to judge the presence/absence of drift. When the processing function unit 240 detects drift at any one of the excitation patterns, the detected value is compared with the previously-stored "relation data between the value of drift and the value of compensation relative to the flow rate signal in a given excitation pattern state, i.e., in the excitation pattern state creating the uniformly-distributed magnetic field (having been obtained through actual examination or theoretical calculation) to obtain the value of compensation. When a signal from the processing function unit 240 indicates that the value of compensation has been determined the control unit 230 controls the exciting circuit 220 thereby causing this circuit to drive the respective coils on the basis of the excitation pattern for creating the uniformly-distributed magnetic field. The processing function unit 240 computes a flow rate from the electromotive force signal in the uniformly-distributed magnetic field state in response to an instruction from the control unit 230 and compensates for the flow rate signal on the basis of the value of compensation to output a correct flow rate signal. In this way, any drift can be detected even if it is generated in any quadrant zone of the measuring tube 11, and the flow rate can be measured correctly by compensating for that drift.

The present invention is not necessarily limited to the foregoing embodiment, but can be realized in various modified forms as below.

(a) In the detector shown in FIG. 4, it is possible to provide one pair of electrodes mutually opposite each other in the YY' axis direction, in addition to the pair of electrodes mutually opposite each other in the XX' axis direction, so as to provide a total of two pairs of electrodes.

Figure 22:
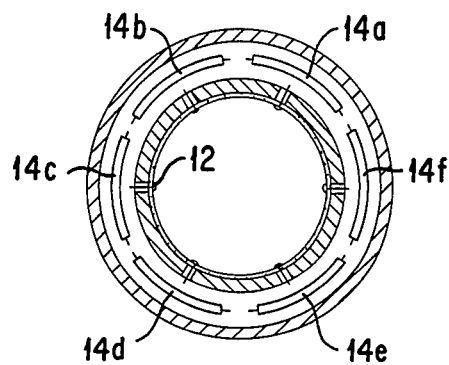
FIG. 22 is a lateral sectional view showing a modification example of the electromagnetic flowmeter detector according to the present invention.

(b) As shown in FIG. 22, the core 14 may be divided into six portions, around which coils 15a, 15b, 15c, 15d, 15e and 15f may be wound respectively. There may be included three pairs of electrodes 12. Or, the detector may include another number of coils and electrodes.

Figure 23:
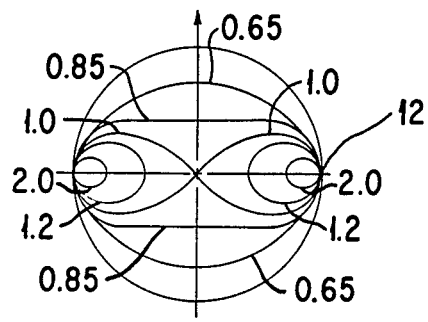
FIG. 23 is a diagram showing the distribution of rate of contribution to electromotive force in the electromagnetic flowmeter detector.

(c) Making use of the property of the present detector that the flux distribution in the magnetic field applied to the measuring tube can be altered widely by changing the excitation pattern of plural coils, and by concentrating the magnetic flux on a spot where the rate of contribution to electromotive force of the electromagnetic flowmeter shown in FIG. 23 is the largest, it is possible to make the detector measurable at a low power, although suffering an influence of drift.

Figure 24:
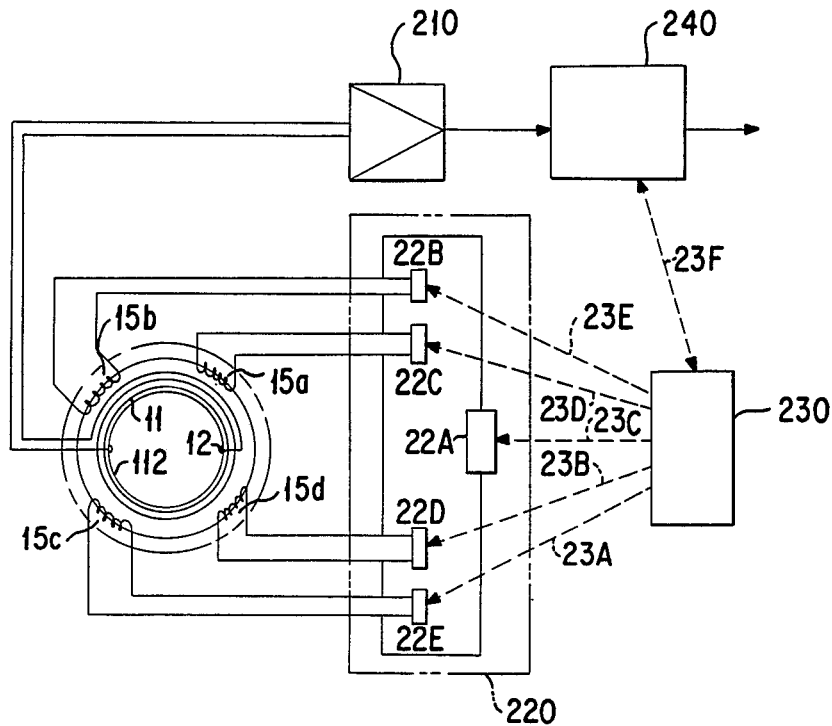
FIG. 24 is a block diagram showing one embodiment of the electromagnetic flowmeter.

FIG. 24 shows the details the of a block diagram showing an embodiment of the electromagnetic flow meter utilizing and further detailing the converter of FIG. 20. The converter circuit 210 described above with respect to FIG. 20, receives an output signal from electrodes 12 and the switches 22b, c, d, e are controlled by signals from the control unit 230 on the basis of a multiple of previously stored excitation the switches in the circuit 220 to apply an excitation signal to each coil so as to create successively different excitation patterns. If an operator wishes to turn on the coils 15a and 15d, the switches 22c and 22d remain open while the switches 22b and 22e are shut.

The construction of the converter circuit 210, the control unit 230 and the processing function unit, which compares the electromagnetic foresignal provided from the converter circuit 210 synchronously with each excitation pattern state with a previously-stored "correlation data among excitation pattern, electromotive force and drift" to detect the value of the drift are well known in the art with respect to the individual items 210, 240 and 230 themselves.

As apparent from the foregoing description, in accordance with the present invention, the magnetic field generating portion of the electromagnetic flowmeter detector is formed by the coil section whose coils are wound in a toroidal form, facially symmetrically with respect to a plane including a fluid axis and being orthogonal to a plane including the electrodes and the fluid axis, around the magnetic core of a cylinder shape disposed concentrically with a gap on the outside of the measuring tube made of a non-magnetic pipe having at least one pair of electrodes. Thus, the length of the magnetic field generating portion in the fluid axis direction can be decreased remarkably and the electromagnetic flowmeter detector of a short inter-face distance can be realized.

The outer casing, including coils of the conventional structure, could not be mounted inside a pitch circle of fitting bolts of the connecting flange, however, the present coil is small in size in the radial direction of the measuring tube, so that the outer casing can be mounted, contrary to the prior art. Further, because the length of the magnetic field generating portion in the axial direction of the measuring tube is remarkably shortened in comparison with the conventional coil of a saddle shape, the electromagnetic flowmeter detector of a short inter-face distance can be realized. On the other hand, the electromagnetic flowmeter converter of the present invention utilizes the property of the magnetic field generating portion that the flux distribution of the magnetic field applied to the measuring tube can be changed widely by altering the excitation pattern for the plural coils. That is, the converting section of the present converter is equipped with a control unit which controls the exciting circuit on the basis of the plural previously-stored excitation patterns to cause the exciting circuit to excite the respective coils successively with different excitation patterns. The processing function unit controlled by the control unit compares the electromotive force signal obtained from the electrodes in each excitation pattern state with the previously-stored correlation data among excitation pattern, electromotive force and drift to detect the value of drift. This processing function unit compares the detected value with the previously-stored relation data between the value of drift and the value of compensation relative to the flow rate signal in a given excitation pattern state (for example, the excitation pattern state of creating the uniformly-distributed magnetic field) to obtain the value of compensation, and compensates for the flow rate signal in the given excitation pattern state on the basis of the obtained value of compensation to output the correct flow rate signal. Accordingly, the present converter can detect drift even if it is generated in any of quadrants of the measuring tube. Thus, an electromagnetic flowmeter can be realized which compensates for an influence of detected drift and measures the correct flow rate.

Therefore, by the use of the electromagnetric flowmeter according to the present invention, drift generated by valves, inflected pipes, reducers, etc., arranged in close vicinity to the detector can be compensated for and the correct flow rate can be measured. Accordingly, the present electromagnetic flowmeter detector can be stored in a small pit together with valves, inflected pipes and the like arranged close to the detector. Thus, the mounting space can be utilized effectively in cooperation with the short inter-face structure of the detector itself, and the present electromagnetic flowmeter can be installed easily and advantageously in a plant including complicated valves, pipes and networks.

While the preferred embodiments have been described, variations thereto will occur to those skilled in the art within the scope of the present inventive concepts which are delineated by the following claim.

What is claimed as new and desired to be secured by Letters Patent of the United States is:

1. An electromagnetic flowmeter equipped with an electromagnetic flowmeter detector of the structure in that a magnetic core of a cylinder shape disposed concentrically with a gap on the outside of a non-magnetic measuring pipe having at least one pair of electrodes is divided evenly along its circumference with notches, and a coil is wound in a toroidal form around each divided core portion, and a converting section including a control unit for controlling an exciting circuit on the basis of plural previously-stored excitation patterns for said respective coils to cause said exciting circuit to excite said coils successively with different excitation patterns, and a processing function unit controlled by said control unit for comparing an electromotive force signal obtained from said electrodes in each excitation pattern state with a previously-stored correlation data among excitation patterns, electromotive force and drift to detect the value of drift, for comparing the detected value with a previously-stored relation data between the value of drift and the value of compensation relative to a flow rate signal in a given excitation pattern state to obtain the value of compensation, and for compensating for the flow rate signal in the given excitation pattern state in accordance with that value of compensation to output a correct flow rate signal.

* * * * *

UNITED STATES PATENT AND TRADEMARK OFFICE
CERTIFICATE OF CORRECTION

PATENT NO. : 4,726,236
DATED : Feb. 23, 1988
INVENTOR(S) : Ichiro Wada

It is certified that error appears in the above-identified patent and that said Letters Patent is hereby corrected as shown below:

Add the following to the Foreign Application Priority Data:

--Mar. 30, 1984 [JP]   Japan ................ 59-44974[U]--

Signed and Sealed this

Third Day of January, 1989

Attest:

DONALD J. QUIGG

Attesting Officer

Commissioner of Patents and Trademarks